United States Patent
Mulkar et al.

(10) Patent No.: US 12,323,332 B2
(45) Date of Patent: Jun. 3, 2025

(54) SYSTEM AND METHOD FOR MANAGING DISTRIBUTED SHAPING IN A COMPUTER NETWORK

(71) Applicant: Sandvine Corporation, Waterloo (CA)

(72) Inventors: Tushar Mulkar, Karnataka (IN); Yash Pradhan, Haryana (IN); Robert Bird, Orlando, FL (US)

( * ) Notice: Subject to any disclaimer, the term of this patent is extended or adjusted under 35 U.S.C. 154(b) by 337 days.

(21) Appl. No.: 17/895,512

(22) Filed: Aug. 25, 2022

(65) Prior Publication Data

US 2023/0077864 A1 Mar. 16, 2023

Related U.S. Application Data

(60) Provisional application No. 63/238,869, filed on Aug. 31, 2021.

(51) Int. Cl.
*H04L 47/22* (2022.01)
*H04L 41/0896* (2022.01)

(52) U.S. Cl.
CPC .................................. *H04L 47/22* (2013.01)

(58) Field of Classification Search
CPC ... H04L 47/22; H04L 47/805; H04L 47/2441; H04L 47/2433; H04L 47/24; H04L 47/2483; H04L 47/225; H04L 47/40; H04L 47/52; H04L 47/125; H04L 41/0896; H04L 43/026; H04L 43/08
See application file for complete search history.

(56) References Cited

U.S. PATENT DOCUMENTS

| | | | | |
|---|---|---|---|---|
| 7,590,149 | B1 * | 9/2009 | Bharali | H04L 45/64 370/468 |
| 8,509,074 | B1 * | 8/2013 | Roberts | H04L 43/16 370/232 |
| 10,873,533 | B1 * | 12/2020 | Ismailsheriff | H04L 47/27 |
| 10,904,150 | B1 * | 1/2021 | Kampeas | H04L 45/70 |

(Continued)

FOREIGN PATENT DOCUMENTS

| | | |
|---|---|---|
| EP | 3633939 A1 | 4/2020 |
| WO | 2006108282 A1 | 10/2006 |

OTHER PUBLICATIONS

U.S. Appl. No. 17/864,925, filed Jul. 14, 2022, Tushar Mulkar.
(Continued)

*Primary Examiner* — Alina A Boutah
(74) *Attorney, Agent, or Firm* — Neil W. Henderson; Amarok IP Inc.

(57) ABSTRACT

A system and method for managing distributed shaping in a computer network. The system including: a plurality of logic nodes, each logic node including: a packet processor configured to determine metrics associated with traffic flows in the computer network; a control processor configured to determine a quality value based on the determined metrics and communicate with each of the plurality of logic nodes; and a shaper object configured to shape the network traffic. The method including: initializing each logic node of a plurality of logic nodes; determining metrics associated with traffic flows in the computer network; determining a quality value based on the determined metrics; communicating the metrics with each of the plurality of logic nodes; and shaping the network traffic flows based on the quality value.

15 Claims, 10 Drawing Sheets

(56) References Cited

U.S. PATENT DOCUMENTS

| | | | | |
|---|---|---|---|---|
| 2002/0186661 | A1* | 12/2002 | Santiago | H04L 47/10 370/386 |
| 2003/0007453 | A1* | 1/2003 | Ogier | H04L 47/17 370/468 |
| 2008/0049615 | A1* | 2/2008 | Bugenhagen | H04L 43/0817 370/230.1 |
| 2009/0290491 | A1* | 11/2009 | Karagiannis | H04L 41/14 370/465 |
| 2010/0208587 | A1* | 8/2010 | Landry | H04L 47/10 370/230.1 |
| 2015/0350083 | A1* | 12/2015 | Goodson | H04L 43/026 370/236 |
| 2016/0112335 | A1* | 4/2016 | Bouanen | H04L 47/26 370/236 |
| 2016/0323186 | A1* | 11/2016 | Dillon | H04L 47/2483 |
| 2018/0351812 | A1* | 12/2018 | Borch | H04L 43/0882 |
| 2019/0052532 | A1* | 2/2019 | Chen | H04L 41/0895 |
| 2019/0158371 | A1* | 5/2019 | Dillon | H04L 47/196 |
| 2020/0112483 | A1* | 4/2020 | Sridhar | H04L 41/5067 |
| 2023/0060315 | A1* | 3/2023 | Kanagarathinam | H04M 7/0081 |

OTHER PUBLICATIONS

U.S. Appl. No. 17/864,962, filed Jul. 14, 2022, Tushar Mulkar
Extended European Search Report, European Patent Office, on EP Application No. 22184661.1, dated Nov. 24, 2022.
Extended European Search Report, European Patent Office, on EP Application No. 22184678.5, dated Nov. 25, 2022.
Extended European Search Report, European Patent Office, on EP Application No. 22192287.5, dated Jan. 4, 2023.

* cited by examiner

1. Aggregate Shared Statistic Metric (EMA)
Finding $S_{sum}$, (EMA sum) is essential for the calculation of 'Q'. Hence, the total $S_i$ received (including local $S_i$) is aggregated to get this value.

$$S_{sum} = \sum_{i=1}^{n} S_i$$

2. Calculate $Q_i$ for each node and $Q_{sum}$
The quality value for each node can be calculated using the formula described in section 2.2, $$Q_{AL} = \frac{S_{AL}}{S_{sum}} \times L - B_{AL}$$

This is then aggregated to find $Q_{sum}$, $$Q_{sum} = \sum_{i=1}^{n} Q_i$$

3. Calculate bandwidth for each node
Bandwidth for each ActiveLogic can be calculated using the formula $$B_{AL}' = B_{AL} + \frac{\alpha_i Q_{AL} - Q_{sum}}{2(n-1)}$$

Fig. 7

The total bandwidth utilization in the cluster ($U_{sum}$) is calculated as follows, $$U_{sum} = U_1 + U_2 + \ldots U_n$$

$U_1$, $U_2$ etc are shared between nodes through messages (as described in step 3)

if total bandwidth utilization ($U_{sum}$) < X% of limit:
    extra bandwidth = shaping limit - bandwidth utilization
final bandwidth allocated = bandwidth calculated (in step 4) + extra bandwidth

Fig. 8

| AL1 | AL2 | AL3 |
|---|---|---|
| AL1 Bandwidth Allocation : 20 Mbps (Calculated)<br><br>AL1 Input: 30Mbps (Local Demand) | AL2 Bandwidth Allocation : 40 Mbps (Calculated)<br><br>AL2 Input: 60Mbps (Local Demand) | AL3 Bandwidth Allocation : 60 Mbps (Calculated)<br><br>AL3 Input: 90Mbps (Local Demand) |
| AL2 Bandwidth Allocation : 40 Mbps (Calculated)<br><br>AL2 Input: 60Mbps (Received) | AL1 Bandwidth Allocation : 20 Mbps (Calculated)<br><br>AL1 Input: 30Mbps (Received) | AL1 Bandwidth Allocation : 20 Mbps (Calculated)<br><br>AL1 Input: 30Mbps (Received) |
| AL3 Bandwidth Allocation : 60 Mbps (Calculated)<br><br>AL3 Input: 90Mbps (Received) | AL3 Bandwidth Allocation : 60 Mbps (Calculated)<br><br>AL3 Input: 90Mbps (Received) | AL2 Bandwidth Allocation : 40 Mbps (Calculated)<br><br>AL2 Input: 60Mbps (Received) |

A three ActiveLogic cluster with shaping limit set to 120Mbps

Fig. 9A

| AL1 | AL2 | AL3 (Disconnected) |
|---|---|---|
| AL1 Bandwidth Allocation : 20 Mbps (Calculated) + 60Mbps (From AL3) = 80 Mbps<br><br>AL1 Input: 30Mbps (Local Demand)<br>AL2 Bandwidth Allocation : 40 Mbps (Calculated)<br><br>AL2 Input: 60Mbps (Received) | AL2 Bandwidth Allocation : 40 Mbps (Calculated) + 60 Mbps from AL3 = 100 Mbps<br><br>AL2 Input: 60Mbps (Local Demand)<br>AL1 Bandwidth Allocation : 20 Mbps (Calculated)<br><br>AL1 Input: 30Mbps (Received) | |

AL3 is disconnected from the system

Fig. 9B

| AL1 | AL2 |
|---|---|
| AL1 Bandwidth Allocation : 40 Mbps (Calculated)<br><br>AL1 Input: 30Mbps (Local Demand) | AL2 Bandwidth Allocation : 80 Mbps (Calculated)<br><br>AL2 Input: 60Mbps (Local Demand) |
| AL2 Bandwidth Allocation : 80 Mbps (Calculated)<br><br>AL2 Input: 60Mbps (Received) | AL1 Bandwidth Allocation :40 Mbps (Calculated)<br><br>AL1 Input: 30Mbps (Received) |

The cluster is in equilibrium state again with only two nodes now (AL1 and AL2)
The bandwidth allocation is now done in the ratio of their demand

Fig. 9C

SYSTEM AND METHOD FOR MANAGING DISTRIBUTED SHAPING IN A COMPUTER NETWORK

RELATED APPLICATION

The present application claims priority on U.S. Provisional Application No. 63/238,869 filed Aug. 31, 2021, which is hereby incorporated in its entirety.

FIELD

The present application relates generally to shaping of computer network traffic. More particularly, the present disclosure relates to a system and method for managing distributed shaping using a quality value.

BACKGROUND

Network operators, Internet Service Providers (ISP), or the like (generally "ISP"), may operate or use a variety of computer networks, for example, cable, fiber, or wireless (4G, 5G, or the like) and will generally have a limited amount of bandwidth available. The subscribers registered with the ISP generally share this bandwidth in various ways. When the total of bandwidth used by all the subscribers is within the limit of the bandwidth provided by or available to the ISP, the quality of service and experience on applications is generally not impacted. However, when the total of bandwidth required by subscribers exceeds the bandwidth available to the ISP, the Quality of Experience (QoE) on applications by subscribers may suffer. Under these conditions, the network can become congested as the demand for traffic is higher than the bandwidth available.

A subscriber running background traffic (for example, bit torrent, file download, or the like) may be more tolerant to lower available bandwidth, while a subscriber on a video call or streaming video may notice degradation in quality of experience very quickly. Even though an ISP may want to provide as much bandwidth as subscribers' desire, the bandwidth comes with a cost. Therefore, bandwidth shaping is often applied on network traffic to limit the amount of bandwidth used by an individual subscriber and/or group of subscribers and/or specific application(s) or the like based on different criteria to try to manage bandwidth depending on operator deployment choice. Prioritized or optimized use of bandwidth, dividing shared bandwidth among each subscriber/group of subscribers and giving preference to priority traffic during bandwidth congestion are a few examples of dividing bandwidth among subscribers.

However, conventional methods of working with bandwidth encounter various issues, particularly when working with distributed systems. In a distributed system, there can be multiple nodes handling different levels of bandwidth and a common bandwidth shaping approach can result in uneven or unfair usage of bandwidth among subscribers or the like. It is therefore desirable to provide an improved method and system for managing network traffic shaping in a distributed environment.

The above information is presented as background information only to assist with an understanding of the present disclosure. No determination has been made, and no assertion is made, as to whether any of the above might be applicable as prior art with regard to the present disclosure.

SUMMARY

According to an aspect herein, there is provided a system for managing distributed shaping in a computer network, the system including: a plurality of logic nodes, each logic node including: a packet processor configured to determine metrics associated with traffic flows in the computer network; a control processor configured to determine a quality value based on the determined metrics and communicate with each of the plurality of logic nodes; and a shaper object configured to shape the network traffic.

In some cases, each logic node may be configured to communicate with others of the plurality of logic nodes in order to balance traffic shaping among the logic nodes.

In some cases, balancing of the traffic flows may include using the quality value to determine if bandwidth allocation should be adjusted upward or downward at each logic node.

In some cases, the quality value may use an exponential moving average for the one or more of the metrics.

In some cases, the quality value may use the exponential moving average of the input of traffic at each logic node.

In some cases, the control processor may use a smoothing factor configured to smooth the average of the exponential moving average.

In some cases, the quality value may be determined at each of the logic nodes for all of the logic nodes.

In some cases, the control processor may be further configured to determine whether there is additional bandwidth to allocated to any of the logic nodes.

In some cases, the control processor may be further configured to determine a utilization percentage for each logic node.

In some case, if the utilization percentage is over a utilization threshold at the logic node and there is bandwidth to be allocated, the logic node receives a higher bandwidth allocation.

In another aspect there is provided a method for managing distributed shaping in a computer network, the method including: initializing each logic node of a plurality of logic nodes; determining metrics associated with traffic flows in the computer network; determining a quality value based on the determined metrics; communicating the metrics with each of the plurality of logic nodes; and shaping the network traffic flows based on the quality value.

In some cases, the shaping of the traffic flows may include using the quality value to determine if bandwidth allocation should be adjusted upward or downward at each logic node.

In some cases, the quality value may use an exponential moving average for the one or more of the metrics.

In some cases, the quality value may use the exponential moving average of the input of traffic at each logic node.

In some cases, determining metrics may include determining a smoothing factor to smooth the average of the exponential moving average.

In some cases, determining a quality value may include determining a quality value for each of the logic nodes at each logic node.

In some cases, the method may further include determining whether there is additional bandwidth to allocated to any of the logic nodes.

In some cases, the method may further include determining a utilization percentage for each logic node.

In some cases, if the utilization percentage is over a utilization threshold at the logic node and there is bandwidth to be allocated, providing a higher bandwidth allocation to the logic node.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 7 illustrates calculation of a quality value in a method for distributed shaping according to an embodiment;

FIG. 8 illustrates calculation of a bandwidth in a method for distributed shaping according to an embodiment;

FIGS. 9A, 9B, 9C illustrates fault tolerance principles in a method for distributed shaping according to an embodiment;

DETAILED DESCRIPTION

Figure 1:
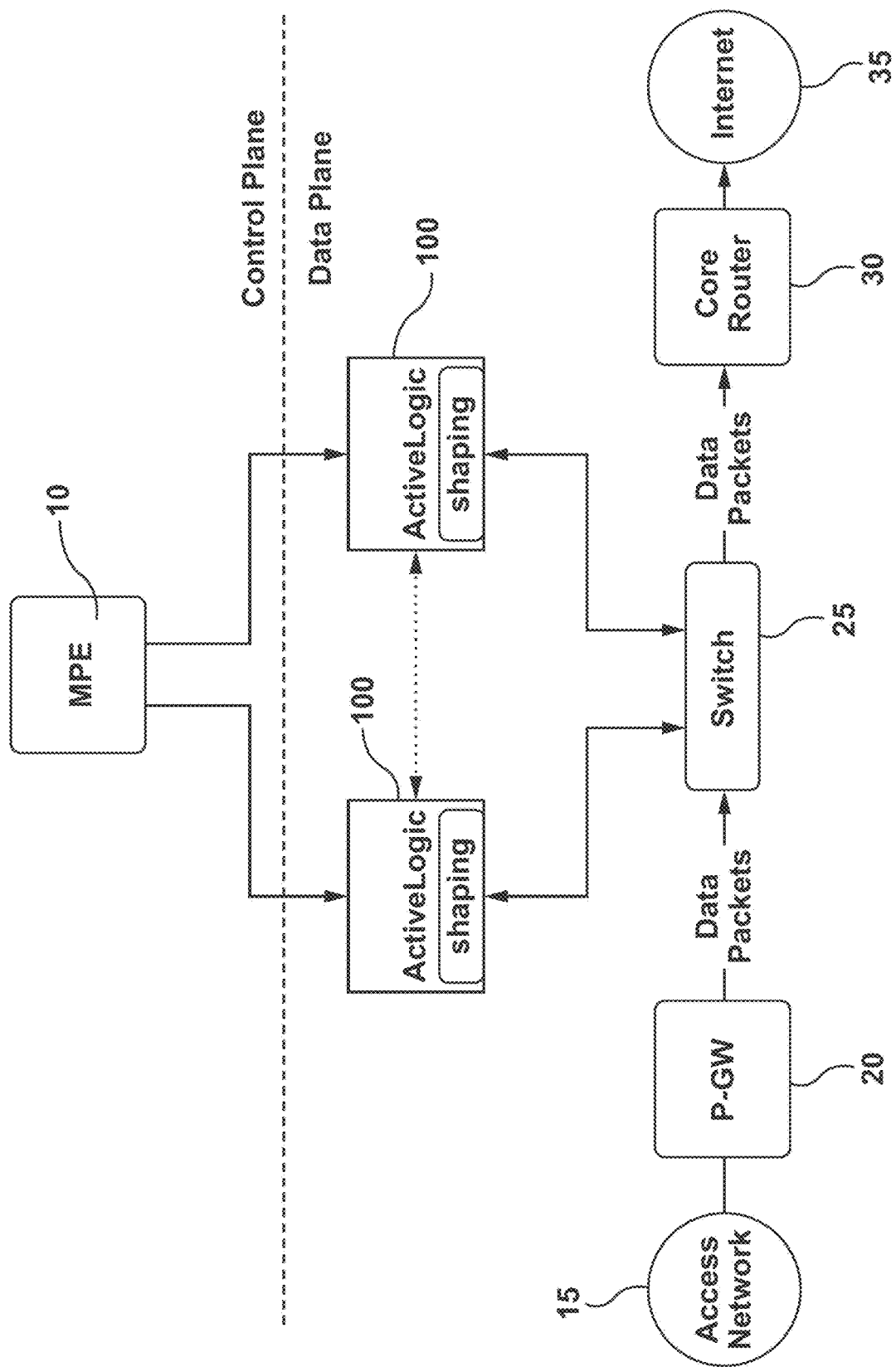
FIG. 1 illustrates an environment for a system for distributed shaping of network traffic according to an embodiment.

Generally, the present disclosure provides a method and system for managing network traffic shaping over a plurality of distributed nodes. In particular, the distributed shaping makes use of a metric referred to herein as a quality value (sometimes "Q value"). Embodiments of the system and method detailed herein are intended to monitor traffic flow and coordinate shaping of the traffic flow in a distributed manner. In some cases, the system may determine traffic flow data for the traffic flow received at each of the nodes (logic nodes) within the distributed system. Each logic node may communicate with each of the other logic nodes at a predetermined synchronization interval, which may include real-time or near real-time traffic statistics to determine the overall traffic flow. Each node, based on the overall traffic flow, can then be configured to shape the traffic flow through the node in conjunction with the traffic flowing through the other nodes.

In some cases, embodiments of the system and method provided herein may involve periodically adjusting the bandwidth allocation of logic nodes based on changes in traffic through the logic nodes. In this way, shaping can be performed in a distributed manner but with a balancing of needs of each of the logic nodes. In some cases, the shaping described herein can be combined with other types of shaping such as "priority shaping", in which some traffic may be given precedence over other traffic, or the like.

In a non-distributed environment, a shaper object is generally aware of the total available bandwidth and the respective bandwidth demands and can shape traffic individually. However, in distributed environments, there are typically a plurality of shaper objects operating individually, in that each shaper object will shape whatever traffic flows through the shaper object based on the rules assigned to that shaper object. This can lead to less efficient bandwidth usage.

In the following description, it can be useful to consider the following general definitions:

Logic node and/or Logic module: an entity that receives traffic from various hosts, identifies an appropriate shaper object to which the traffic should be subjected. Once shaping is performed, the logic module handles (general transmits or drops) the packets according to shaping result.

Shaper Object and/or Shaper Module: a logical entity that holds information required to perform shaping on the received traffic.

Packet Processor (sometimes referred to as data processor): a module in a logic node that receives, shapes, and transmits traffic. A Shaper Object associated with a packet processor collects the statistics regarding per priority traffic received and transmitted for an interval, which is shared with a control processor periodically. The Shaper Object is generally also informed about how much bandwidth can be utilized for a next interval by the Control Processor.

Control Processor: a module that calculates the available bandwidth for shaper objects within the current logic node based on the information received from the Data processor and other Control Processors in a cluster. It also sends local information to other Control Processors operating in the cluster.

Sync Interval: Interval (typically in the range of milliseconds or the like) within which, each control processor in logic nodes communicates the information about traffic statistics to Control Processors in other logic nodes and calculates bandwidth to be used by the local shaper object.

Quality Value: a metric calculated as a combination of various other metrics or parameters related to the network traffic and may include metrics such as load to the system (input rate), previous bandwidth allocation, total shaping rate, and the like. Quality value is intended to compare a plurality of metrics and/or parameters via a single value. In operation, the quality value is intended that each logic node will tend toward the same quality value as the system approaches equilibrium.

FIG. 1 illustrates an environment for an embodiment of the distributed system 100 detailed herein. As seen in FIG. 1, network traffic flows from an Access Network 15, through a packet gateway 20 to a switch 25. The switch 25 may then route traffic to and from the distributed system 100 based on the network configuration. The distributed system 100 can include a plurality of Logic nodes 102, which perform shaping on the traffic. The logic nodes 102 may be provided with policy information such as bandwidth limits by a policy engine 10. The shaped traffic is then sent to the core router 30 and the Internet 35. It will be understood that traffic flowing from the Internet 35 to the Access Network 15 will generally traverse the same elements in opposite order. The logic nodes 102 may be inline data plane elements responsible for shaping traffic appropriately based on operator policies and product configuration. The PE 10 may be a control plane element with knowledge of subscriber mapping to traffic flows and may also provision shaper parameters to the system.

In a distributed environment, the plurality of logic nodes can generally be placed around the network in a distributed manner. A set of N logic nodes 102 (sometimes call logic modules) serving traffic and performing shaping in the network, is generally referred to as a cluster. Typically, traffic is distributed to individual logic nodes and each logic node allocates their share of the bandwidth to traffic processed by them. It will be understood that it is generally better to have appropriate distribution of the available bandwidth among the logic nodes in the cluster and throughout the network.

Embodiments of the system and method detailed herein are intended to achieve appropriate bandwidth allocation for shaping in a cluster/network.

Figure 2:
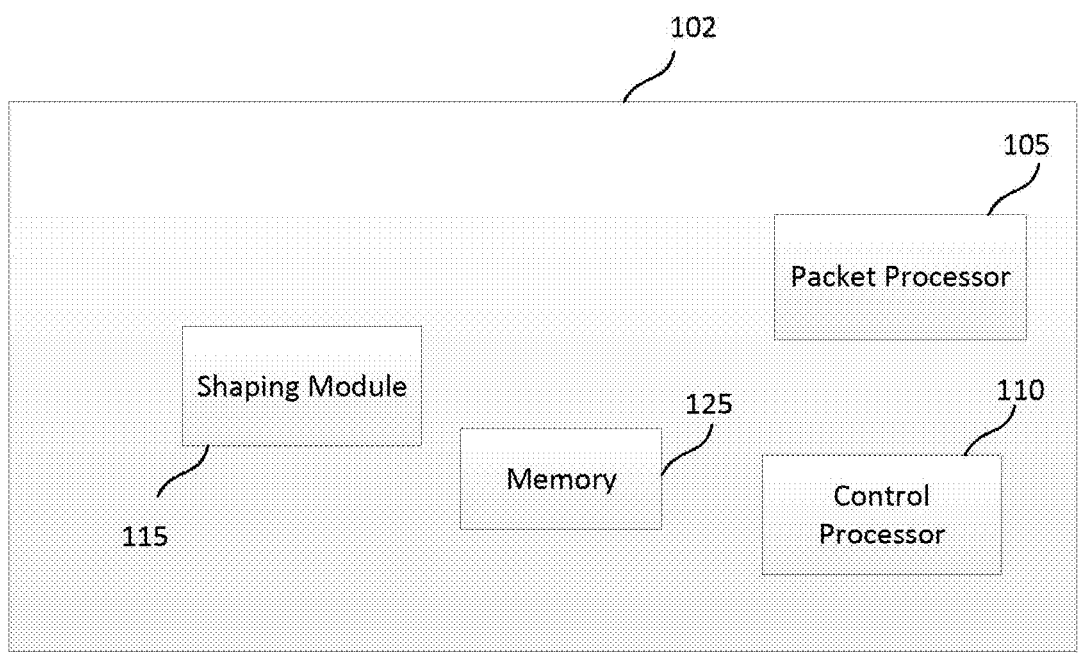
FIG. 2 illustrates a node of a system for distributed shaping according to an embodiment.

FIG. 2 illustrates an embodiment of a logic node 102 of the distributed system 100 for managing network traffic in a distributed environment. The logic node includes a packet processor 105, a control processor 110, a shaping module 115, and will typically include at least one memory component 125. It will be understood that each logic node 102 may include a plurality of packet processors 105 depending on the volume of traffic. Although there is intended to typically only have one control processor 110, this could also be distributed. In some cases, the packet processor and control processor could be logical concepts running on one or more physical processors either locally or remotely. Typically, processing speeds require local and distinct processing capability. As noted above, the system 100 may include a plurality of the logic nodes 102, each having its own similar modules and components. The system 100 is generally intended to be distributed and reside in the data plane. The packet and control processors or other processors may be configured to execute instructions stored in the memory component in order for the processors/modules to execute their functions. The system 100 is intended to receive information from computer network equipment (such as PE 10 or the like) that allows the system 100 to implement policy rules for the network.

The packet processor 105 works with the shaping module 115 (sometimes called a shaping object or shaper object) to receive packets from the traffic flow, perform shaping based on the packet, and transmit or drop the packet according to a shaping result. The shaper module 115 or shaper object is generally a logical entity that holds the information required to perform shaping on the traffic received. This information may include, for example, bandwidth available, bandwidth utilized, and the like.

The packet processor 105 can also collect statistics regarding, for example, traffic received and transmitted over a predetermined interval, which can be shared with the control processor 110 periodically.

The control processor 110 generally controls the logic node 102. In particular, the control processor 110 communicates with the packet processor 105 and other Control Processors 110 in a cluster.

A Sync Interval is intended to be a predetermined interval in, for example, milliseconds, seconds, or as appropriate, within which, the control processor 110 associated with a logic node 102 communicates the information about traffic flow data to the Control Processors 110 of other logic modules 102 in the cluster. This traffic flow data is intended to be used to determine bandwidth to be utilized by each shaper object locally. The Sync Interval may be preconfigured in each of the nodes in the cluster and may be updated depending on traffic flows, quality value or the like.

Figure 3:
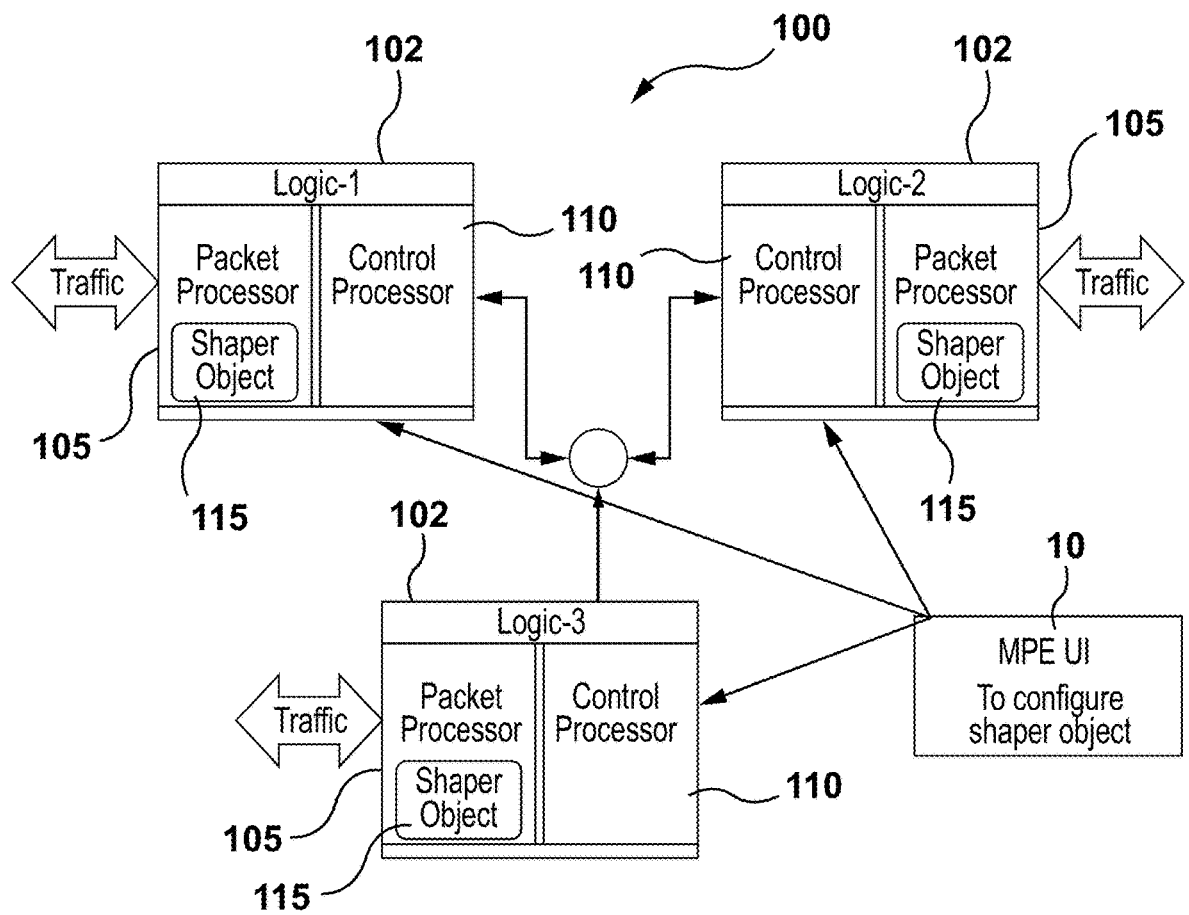
FIG. 3 illustrates a plurality of nodes in a distributed shaping system according to an embodiment.

FIG. 3 illustrates a system diagram showing distributed logic nodes making an embodiment of a system 100 herein. In larger-scale network deployments, a single logic node is usually not sufficient for packet processing. To process larger amounts of network traffic, a plurality of logic nodes can be used, in what is known as a cluster deployment. Each logic module 102 may include or be operatively connected to at least one Data processor 105 and at least one control processor 110. In some cases, a user or ISP may configure a shaping object with desired expected behavior, for example: a rate at which traffic to be shaped, rules to identify traffic that should be subjected to Shaper Object 115, or the like. This configuration may be parsed by the at least one control processor 110 and sent to the at least one packet processor 105.

The packet processor 105, when it receives traffic, is intended to manage the traffic based on the rules configured by the control plane or policy engine and uses the shaper Object 115 to shape the traffic. The Shaper Object 115 may be allocated with bandwidth available over a predetermined interval. Once an interval is over, traffic data, for example, the amount of traffic and other traffic statistics, collected by the packet processor (via the shaper objects) are passed to the control processor 110. The control processor 110 then propagates this data to all the logic nodes in the cluster. The control processor 110 may aggregate the information received locally as well as the information received from the other logic nodes 102 in the distributed environment to determine bandwidth that can be allocated by local Shaper objects 115 and update the Shaper object 115 via the packet processor 105. In some cases, a shaper object can be configured globally, and each logic node includes an instance of the shaper object (a logical construct that includes shaper rules bases on a parent shaper object.)

In some cases, the traffic statistics collected may be, for example, total traffic through the logic node, traffic demand in that node over an interval for the Shaping object, used bytes in the node over the interval for the shaping object, or the like. In some cases, other traffic statistics, for example, application type, subscriber details, or the like, may also be determined and collected.

Figure 4:
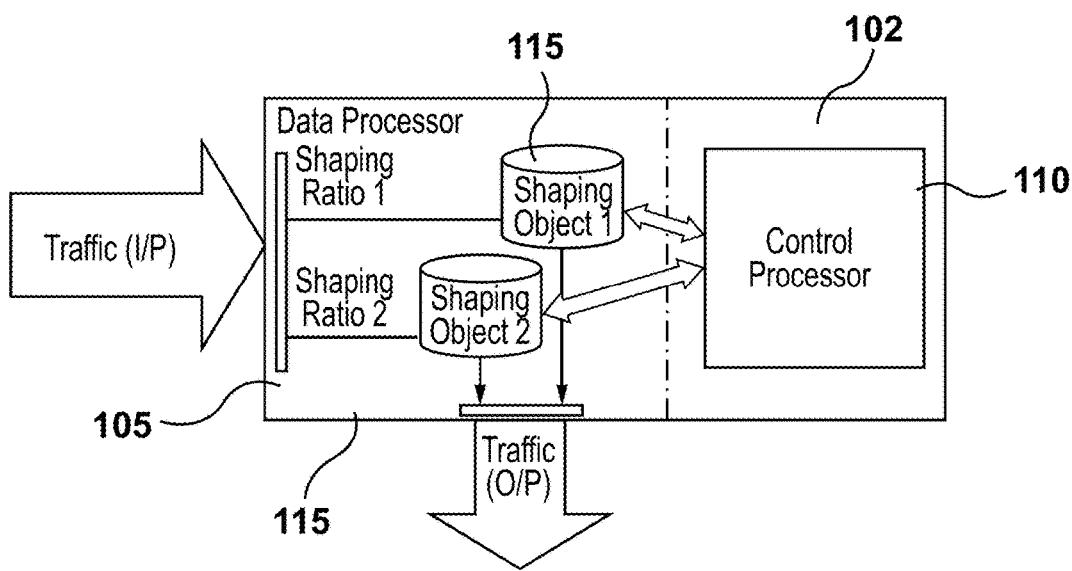
FIG. 4 illustrates another view of a node of a system for distributed shaping according to an embodiment.

FIG. 4 illustrates another view of a logic module 102 according to embodiments herein. The logic node/module 102 is generally a network device in the data plane, which, among other things, can provide the functionality to shape traffic, via for example one or more shaping objects 105. Similar elements will use the same reference numbers from the embodiment described above.

The logic node generally includes a data/packet processor 105, and a control processor 110. The packet processor 105 (also referred to as a data processor) receives traffic and tries to match the traffic or direct the traffic to configured shaping rules via a shaper object 115. Shaping rules select traffic based on various properties, for example, IP range, subscriber information, or the like, to associate the traffic with a particular shaping object and shaping rules. Shaping objects 115 are logical entities that define how the shaped output will look for the traffic matched to that shaping object, such as a set a limit on the bandwidth output. Shaping objects and rules can be configured using a policy engine (PE) 10 (a control plane element) or the user interface for the logic node, which can operate through the control processor. The packet processor handles (such as, allows or drops) packets based on the shaping rules, and the packet processor can also track various traffic statistics, for example, traffic received, bandwidth used, and the like. The amount of bandwidth a packet processor can process is generally dependent on the logic node specifications.

In order to be more effective in shaping, logic nodes in a cluster are intended to behave in a similar manner. In a specific example, there may be some traffic in the network that hits three logic nodes L-1, L-2, and L-3 simultaneously. A shaping object is configured to limit the traffic output tot' Mbps. Then, the expected behavior is that the sum of outputs across Nodes L-1, L-2, and L-3 should be rate-limited tot' Mbps. Thus, some sort of division of bandwidth happens between the nodes so that the total bandwidth in the cluster does not exceed the shaping limit. Primarily, a solution is configured to determine a way to distribute bandwidth amongst the three logic nodes. However, apart from this, the following problems or constraints are also intended to be addressed:

Accuracy: As mentioned herein, ISPs use shaping to efficiently use the bandwidth available on their network. Subscribers expect to receive the speed and Quality of Service (QoS) and Quality of Experience (QoE) they pay for. From an end-user perspective, shaping on a single logic node or shaping in a logic node cluster should have the same subscriber experience. Hence, it is critical that shaping in a cluster be accurate. Embodiments herein aim for the deviation of the output traffic from the configured shaping limit to be less than 5%.

Scalability: Logic nodes can come in various sizes, with differing packet processing capabilities. If logic node variants handling low amounts of bandwidth are used, then the system may include the use of more logic, resulting in large cluster sizes. Even in such cases, embodiments herein are intended to have minimal impact on accuracy and latency.

Equitable Distribution of Bandwidth: The traffic load across the logic nodes may potentially be highly unequal. In such situations, logic nodes should be given an equitable distribution based on their demand.

Susceptibility to Traffic Fluctuations: Sharp fluctuations in traffic are quite common in customer networks (generally referred to as bursts of traffic or traffic bursts). Embodiments herein are intended to not be susceptible to these fluctuations and give good results with various traffic flows.

Fault Tolerance: In a distributed environment, each logic node would have some bandwidth allocated to it, and the sum of these allocations across the cluster would add up to the shaping limit. In case of a loss of a logic node, there should be a way for the cluster to recover. The remaining logic nodes should be able to increase their bandwidth and continue shaping as per the configured limit. Alternatively, an addition of a new logic node to the cluster should also be handled smoothly.

Figure 5:
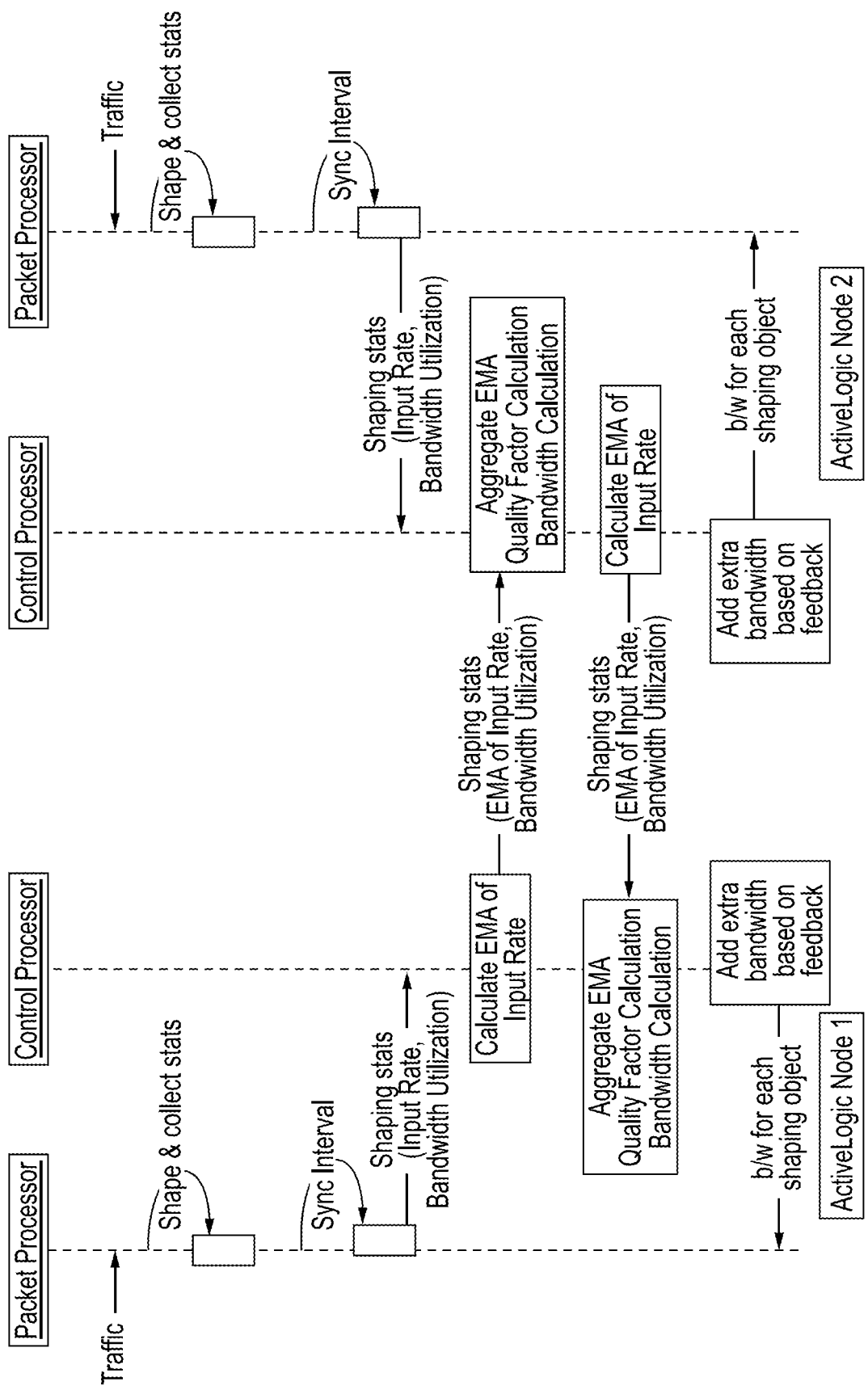
FIG. 5 illustrates a sequence diagram for a method for distributed shaping according to an embodiment.

FIG. 5 illustrates a sequence diagram of a method for shaping in a distributed environment according to an embodiment. As noted herein, logic nodes can be connected to form a cluster (for example, using a star topology or the like) which allows logic nodes to share messages. FIG. 5 highlights various communications and/or processes involved across two logic nodes, but this could be considered for an appropriate number of logic modules in a cluster or in a network.

As shown in FIG. 5, traffic arrives at the packet processor and the packet processor provides for shaping of the traffic. In some cases, if the packet processor is not configured, no shaping will be performed. The packet process is further configured to collect various statistics/metrics, such as the input rate, bandwidth utilization, and the like. At a predetermined time interval (referred to as the sync interval), the packet processor shares the statistics/metrics with the Control Processor. The sync interval can be a configurable parameter, which can be set and then fine-tuned to provide as accurate results as possible in various traffic conditions. The sync interval will generally be in the range of milliseconds.

The control processor receives the statistics from the packet processor and may make modifications or perform calculations on the statistics, for example, determining the exponential moving average of a collected statistic, for example, the input rate, bandwidth utilization or the like. The control processor is also responsible for the exchange of messages between the logic nodes in that the control process is configured to broadcast some statistics from its related packet processor to the network. The control processor is also configured to receive statistical information from the other logic nodes.

Then, based on the statistics received locally, as well as those from other logic nodes, an updated bandwidth for the logic node is determined and shared with the packet processor to perform shaping based on the updated bandwidth (for example, rate-limiting or the like).

Further details of the sequence involved will be detailed below. However, it is useful to first consider a determined metric referred to as quality value.

The quality value is determined based on the principle that the allocation of bandwidth to each logic node can be made more accurate by looking at a plurality of metrics indicating what each logic node's demand may be in the next interval. Some example metrics are 'current demand', 'historical demand', 'current bandwidth allocation', 'total shaping limit' and the like. In order to more easily compare two logic nodes, various metrics can be combined into a single value. The resulting 'quality value' (Q) of each logic node can then be used in the process of bandwidth calculation and allocation.

The metrics to be used in the determination of the quality value, as well as how the metrics may be combined, is generally a function of the various constraints on the system. Some constraints for embodiments of the system are as follows:
  requires the calculated bandwidth for each logic node to be a positive value less than or equal to a cluster shaping limit;
  should handle various traffic flows, without being overly sensitive to fluctuations in traffic loads; and
  should provide equitable distribution of bandwidth, in other words, each logic nodes should be given bandwidth allocation based on their demand. In this case, the more the demand (input) at a logic node, the more the bandwidth would be allocated to that node.

The 'Q' value for one embodiment of the system and method herein may be determined as follows:

$$Q_{AL} = \frac{S_{AL}}{S_{sum}} \times L - B_{AL}$$

Where: $S_{AL}$ is the exponential moving average of the input traffic load at the logic node, $S_{sum}$ is the sum of the individual exponential moving average of input, traffic loads received at each logic node, L is the shaping limit, and $B_{AL}$ is the currently allocated bandwidth to the logic node.

A larger relative quality value for a logic node in comparison with other nodes would indicate that node could require a higher bandwidth allocation. Similarly, a lower relative quality value would indicate the bandwidth allocation for this logic node could be reduced.

As noted, $S_{AL}$ is defined as the exponential moving average (EMA) of the input traffic load received at a logic node. The goal behind taking the EMA is to adjust for fluctuations in demand and look at an overall trend. It will be understood that other calculation methods may be available that achieve a similar function but for this embodiment, EMA was found useful, with some modifications as noted herein.

The general formula for exponential moving average (EMA) is $$S_{AL}=(1-\alpha)\cdot S_{AL}+\alpha\cdot I_{AL}$$

Where, $S_{AL}$ is the calculated EMA; $I_{AL}$ is the input received at the logic node and a is the smoothening factor. When calculations start, for example, when a previous moving average $S_{AL}$=0, it can be determined that $S_{AL}=I_{AL}$. The lower the value of a, the smoother the average becomes (lesser weighting is given to the new input which has arrived). A suitable a value can be chosen initially, for example, 0.01, 0.02 or the like, depending on traffic and requirements. It will be understood that a lower alpha value is better to counter small fluctuations in traffic. However, this may cause problems in case of sudden but sustained load changes (for example, if traffic completely stops at a node). An approach to handle such situations is having a 'dynamic' alpha value which changes based on, for example, the difference in values of the new input and old input.

When considering a dynamic alpha, an example approach could be as follows: define $\alpha$, where in this example $\alpha$=0.01. This can be used for when new input old input, as the minimum $\alpha$ value for new input<old input.

$$\alpha=0.01$$

if new input<old input:

$$\alpha_{temp} = 1 - \frac{\text{new input}}{\text{old input}}$$

$$\alpha = \max(\alpha_{temp}, \alpha)$$

If the difference is very high (for example the new input is close to 0), then $$\frac{newinput}{oldinput}$$

is a very small value, and $\alpha_{temp}$ becomes ~1. This puts almost all the weight for the EMA calculation on the new input received.

This specific example where the statistic/metric being handled is 'input' (in other words bandwidth used), but this EMA modification could be applied for other statistics/metrics as well, for example, output traffic, drops, and the like.

Figure 6:
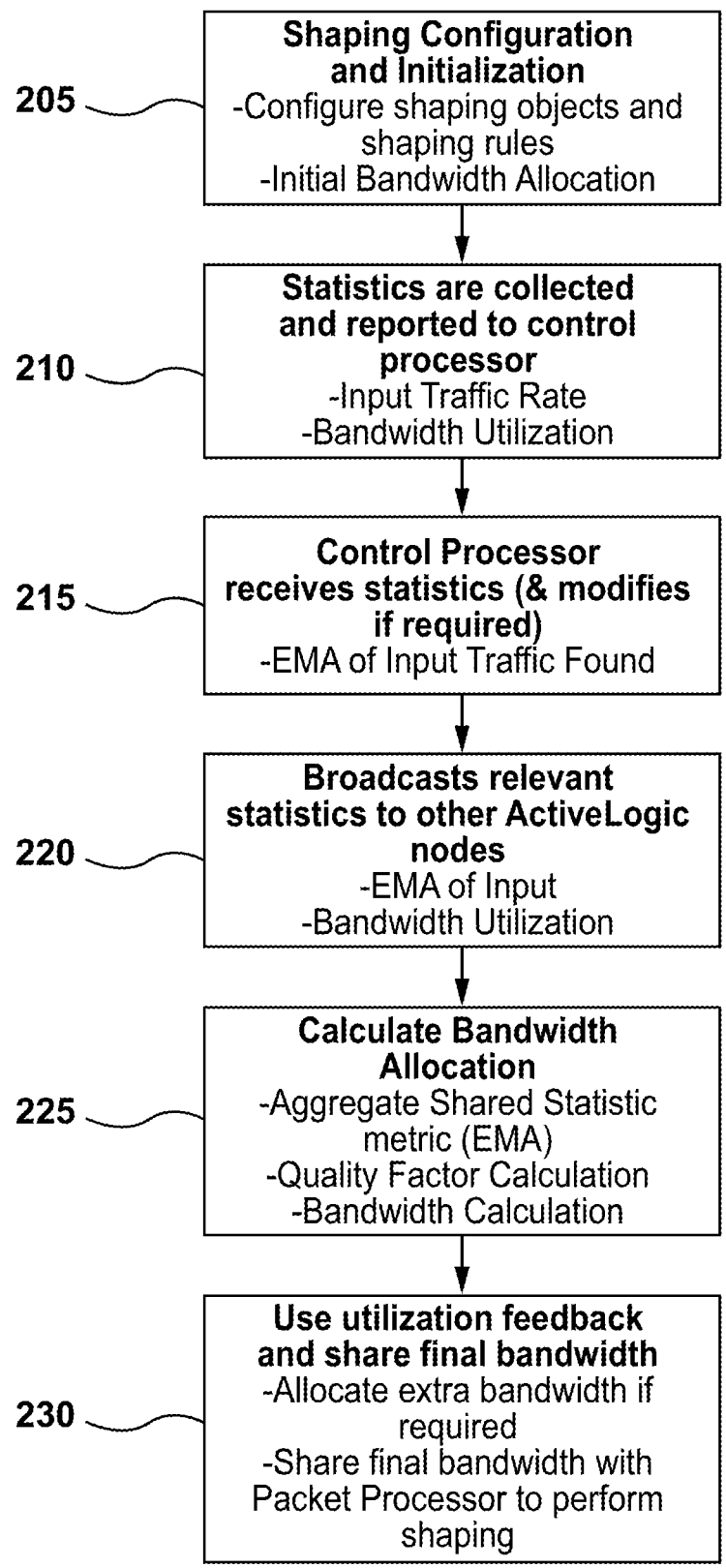
FIG. 6 illustrates a method for distributed shaping according to an embodiment.

FIG. 6 illustrates an embodiment of a method for shaping in a distributed environment. At 205 shaping configuration and initialization may be executed at each shaping object. Initially, shaping can be enabled by configuring shaping objects and shaping rules at each logic node, for example, via a logic node user interface, a Control Plane device like an PE, or the like. In particular, a shaping limit (L) can be set for each shaping object wherein the shaping limit may be the total traffic output for that object across the cluster.

The sync interval can also be defined for later update. For example, if traffic does not appear to be varying significantly over time, a 1-second interval may be sufficient. On the other hand, if there are larger fluctuations in traffic, it may be beneficial to have more frequent synchronization, for example, 100 milliseconds or the like. Following initialization, the sync interval can be monitored automatically or by a user and adjusted accordingly based on the traffic fluctuations.

The smoothening factor (a) used for the EMA calculation can also be defined. While a 'dynamic alpha' can be calculated for new input<old input, for all other cases the system can make use of the configured smoothening factor. In some cases, the configured value can also be used as the minimum value in the dynamic alpha calculation.

Maximum cluster bandwidth utilization for extra bandwidth to be allocated can also be defined. It will be understood that this may typically be defined as X %. This value is typically expressed as a percentage of the shaping limit (L). If bandwidth utilization of the cluster is below X % of the shaping limit L, extra bandwidth can be allocated as detailed below.

Initial Bandwidth Allocation can be determined by, for example, each logic node performing independent bandwidth calculations (as detailed herein). Looking from the perspective of a particular logic node, the logic node's own bandwidth is initialized to the shaping limit (L). The bandwidth for all the other logic nodes may be initialized to zero. For example, from the perspective of AL1:

$$B_{AL1}=L \text{ Mbps}, B_{AL2}=0, B_{AL3}=0 \ldots$$

At 210, the system is configured to collect statistics and report these to the control processor. The packet processor receives network traffic, performs shaping (via shaper objects), and collects various statistics and metrics. In this example, two metrics are considered for illustration purposes—Input Traffic at the logic node, and Bandwidth Utilization at the logic node. It will be understood that other traffic statistics may also be collected and shared. The collected metrics are shared with the control processor via, for example, a message as follows:

Message: Shaper_Demand_Statistics
From: packet processor (For each Shaping Object)
To: Control Processor
Contents:

| Input Traffic - Upstream | Input Traffic - Downstream | Bandwidth Utilization - Upstream | Bandwidth Utilization - Downstream |
|---|---|---|---|

At 215, the control processor receives and modifies the statistics. The control processor receives the metrics from the packet processor. Some modification may be performed to the metrics depending on the type of metric or the like. As an example, in order to avoid the impact of minor traffic fluctuations, the exponential moving average (EMA) of the input traffic received can be taken, as described above. The metrics or modified metrics are then stored in the control processor for further processing, for example, in memory associated with the control processor or the system or the like.

At 220, the control processor sends messages to the other logic nodes. The control processor broadcasts the modified metrics to other logic nodes in a cluster, in the network or the like. In some cases, these may be User Datagram Protocol (UDP) messages with details to identify the logic node and shaping object. Typically, the payload will include for example, the EMA of the input calculated in the previous interval, the bandwidth utilization at the logic node, and the like. A simple example of a message may be as follows:

Message: Node_to_Node_message
    From: control processor (Node X)
    To: control processor (Node Y)
    Contents:

| EMA input Traffic - Upstream | EMA Input Traffic - Downstream | Bandwidth Utilization - Upstream | Bandwidth Utilization - Downstream |
|---|---|---|---|

At 225, the bandwidth allocation is calculated. Every sync interval, calculations are performed to determine the new bandwidth allocation for each logic node. Bandwidth calculations can be based on, for example, the sum of all 'Q' values across the cluster (Qsum). To determine the Qsum value, each logic node is intended to be provided or determine the Q value for every other logic node in the cluster. However, in this example, it may not be possible to directly share a 'Q' value via a message because the calculation of Q values includes Ssum (which requires Si to be shared via a message first). This issue can be addressed by having each logic node keep a copy of the information of the other nodes in the cluster and performing its own set of calculations.

In this case, the information available to a control processor will be as follows: Input traffic received at each logic node and previous bandwidth allocation for each logic Node. FIG. 7 illustrates some example steps for bandwidth calculation from the viewpoint of one logic node.

A similar sequence of steps can be followed for each logic node. The table below illustrates the example based on three logic nodes, but it will be understood that the operations will be similar if further logic nodes are provided.

| AL1 | AL2 | AL3 |
|---|---|---|
| Aggregate Statistics Metric ($S_{sum} = S_1 + S_2 + S_3$) Calculates 'Q' for $AL_1, AL_2, AL_3$ $Q_{sum} = Q_1 + Q_2 + Q_3$ Calculates Bandwidth ($B_{AL}$) for $AL_1, AL_2$ and $AL_3$ | Aggregate Statistics Metric ($S_{sum} = S_2 + S_1 + S_3$) Calculates 'Q' for $AL_1, AL_2, AL_3$ $Q_{sum} = Q_1 + Q_2 + Q_3$ Calculates Bandwidth ($B_{AL}$) for $AL_1, AL_2$ and $AL_3$ | Aggregate Statistics Metric ($S_{sum} = S_3 + S_1 + S_2$) Calculates 'Q' for $AL_1, AL_2, AL_3$ $Q_{sum} = Q_1 + Q_2 + Q_3$ Calculates Bandwidth ($B_{AL}$) for $AL_1, AL_2$ and $AL_3$ |

At 230, utilization feedback is used to determine and share final bandwidth. Before the bandwidth calculated for the local logic node is shared back to the packet processor, there may be an additional check done. As described herein, the EMA of the input can be used to reduce sensitivity to random fluctuations in input. However, this may have the consequence of causing over-shaping in certain situations, for example, when the traffic in the system is significantly below the shaping limit. The above calculations would generally have divided the bandwidth amongst the logic nodes in the ratio of their input traffic loads. However, it is entirely possible that one logic node may receive a sudden burst of traffic. In a situation where overall traffic load is below the shaping limit, the burst of traffic should pass through unshaped, but it may not be the case if that logic node is near its calculated limit.

To provide a solution for this situation, it is possible to use a feedback loop. For example, the bandwidth utilization for that shaping object (associated with the logic node) in the cluster can be compared to the shaping limit. If the bandwidth utilization is below a certain threshold, for example, a particular percentage of the limit, then the system can allocate some additional bandwidth (over and above the previous calculated limit) to the logic node having the burst of traffic. The extra bandwidth allocated can be set to the remaining bandwidth in the system, as illustrated in FIG. 8.

If the extra bandwidth is used, the feedback indicates the higher bandwidth utilization, and the extra bandwidth is no longer allocated. After a final bandwidth allocation is calculated, the allocation is communicated from the control processor to the packet processor for the traffic shaping to occur. An example message may be as follows:

Message: Shaper_Bandwidth
    From: control processor
    To: packet processor (For each Shaping Object)
    Contents:

| Final Bandwidth Allocated (Upstream) | Final Bandwidth Allocated (Downstream) |
|---|---|

As noted above, embodiments of the system and method herein will also have some capability for fault tolerance and/or for the adding or removing logic nodes. As noted herein, the sum of all the bandwidths allocated to the logic nodes generally add up to the total shaping limit (assuming the shaping limit is the total capacity). In the event that a logic node has a fault, or for other reasons is no longer operable, the logic node may be disconnected from the network. As such, there method detailed herein provides for a manner to ensure that the bandwidth allocated to that logic node is not lost or left unused.

In the embodiments above, each logic node is in sync with the other logic nodes through the update messages which are sent. Further, each logic node also performs its own set of calculations for each of the logic nodes in the cluster (as detailed above). This means that at any given time, each logic node is intended to be aware of the bandwidth allocated to all of the other logic nodes.

The concept for fault tolerance in embodiments herein can be illustrated with a specific example. In this example, there are three logic nodes in a cluster with a shaping limit set to 120 Mbps, as shown in FIG. 9A. If a logic node disconnects, the allocated bandwidth of the disconnected logic node should be transferred to other logic nodes. In this example, each logic node knows the allocation for the disconnected logic node so, each logic node adds the full allocated bandwidth from the disconnected node to its allocation as illustrated in FIG. 9B. Notice that in FIG. 9B, the bandwidth allocation for AL1 and AL2 adds up to 120 Mbps from the perspectives of AL1 and AL2 (since they only adjust the allocation for themselves). However, this result disturbs the whole cluster from a state of equilibrium.

Over the next sync intervals, AL1 and AL2 will continue sharing demand (input) details with each other, and Quality Factors will be calculated. Based on this, the method is able to bring the remaining two logic nodes back toward a state of equilibrium as illustrated in FIG. 9C.

Figure 10:
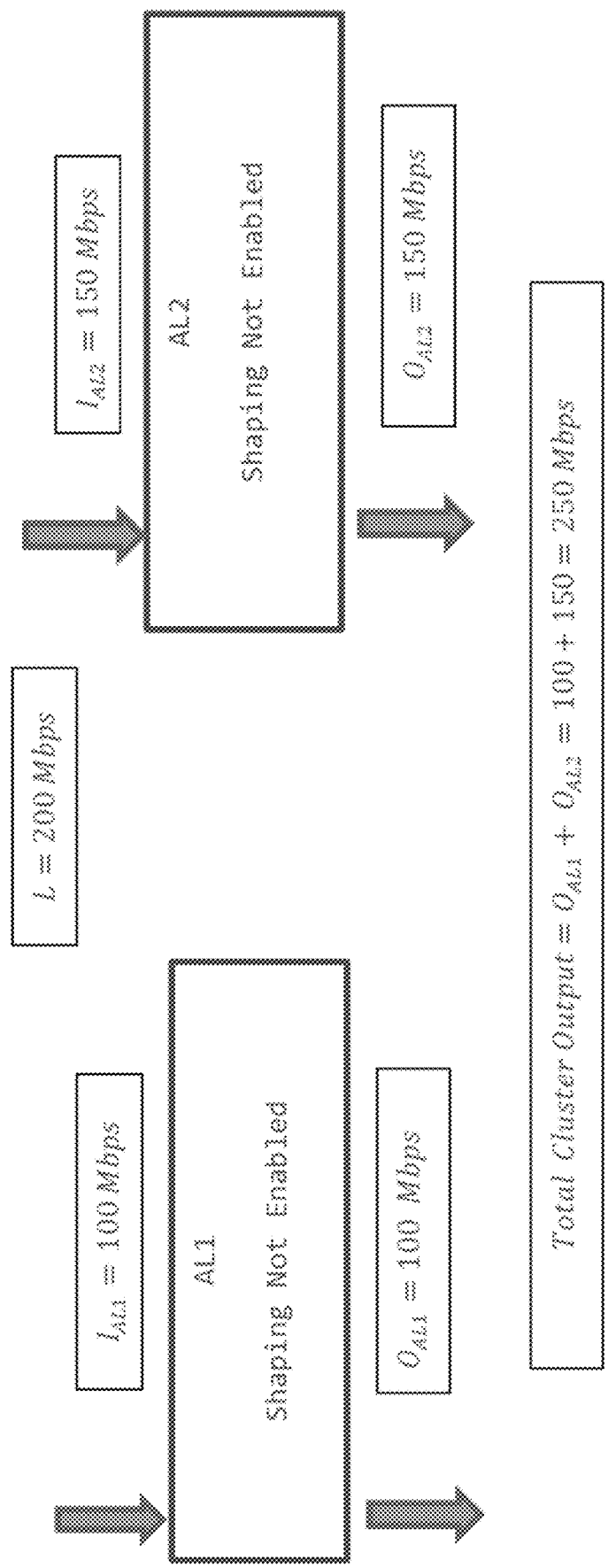
FIG. 10 illustrates an example of an initial state for a system for distributed computing.
Figure 11:
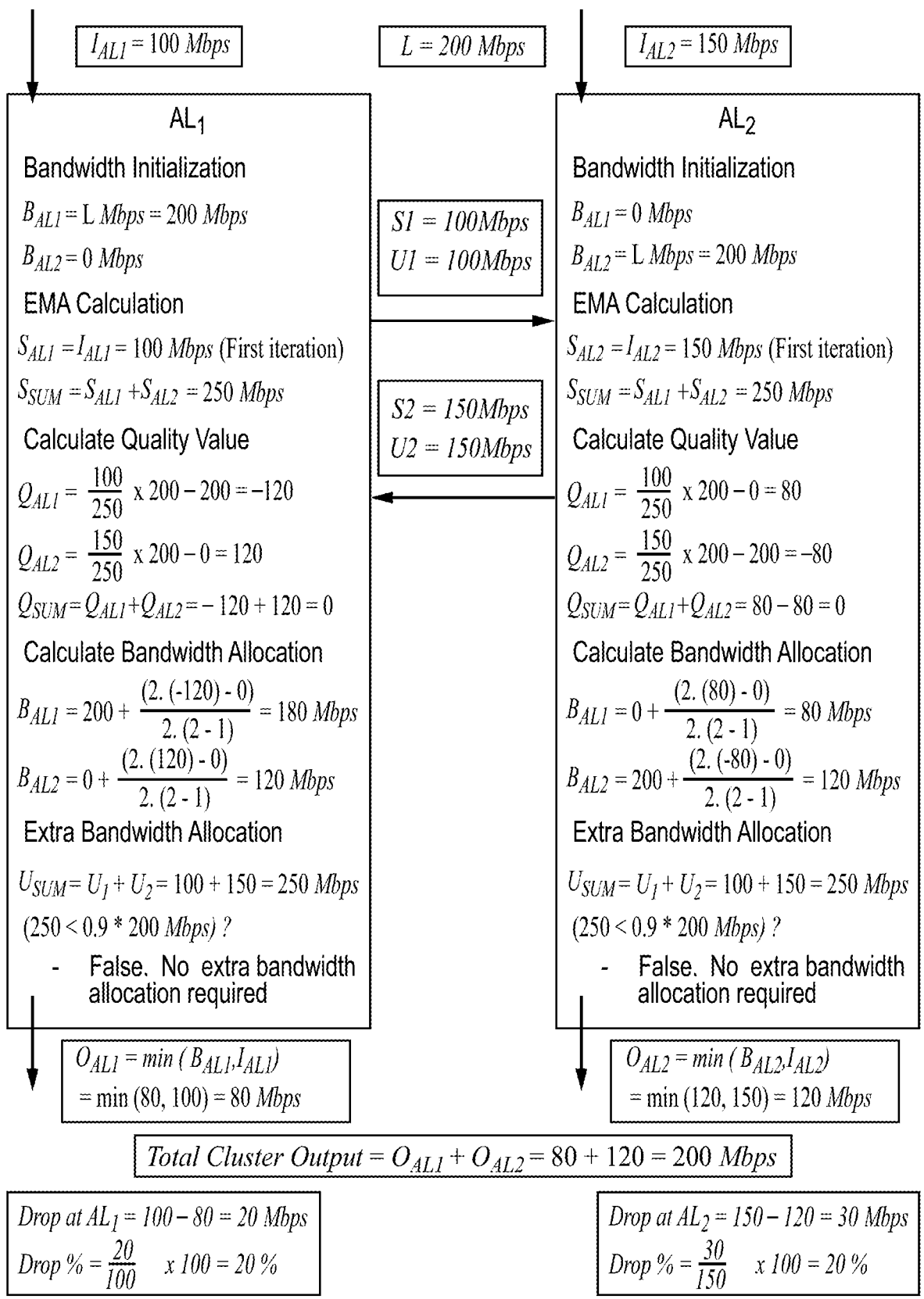
FIG. 11 illustrates an example use of an embodiment of the method herein to the example of FIG. 10.

FIGS. 10 and 11 illustrate a walkthrough of an embodiment of the system and method using a specific example. In this example, there is a logic node cluster/shaping object definition that is defined with a shaping limit (L) of 200 Mbps. This logic node cluster includes 2 logic nodes (N=2), which effectively means the cluster will allow a maximum of 200 Mbps traffic for any traffic matching the defined shaping object for this cluster (each logic node will include an instance of a defined shaper object). In this example, the sync interval (T) is set to 1 second and the utilization threshold for allotment of extra bandwidth (X) is set to 90%.

FIG. 10 illustrates a view of the cluster at t=0, just prior to enabling shaping in the cluster. In FIG. 10, when shaping is not enabled, the total output in the system is 250 Mbps. Once started, an embodiment of a method of distributed shaping with quality value is implemented.

FIG. 11 illustrated the method from a next sync interval and the state of the system at t=1 second. As described herein, the method, in summary, includes shaping objects and rules are configured and bandwidths for each logic node are initialized. The input (or demand) and bandwidth utilization is collected and shared with the control processor. The control processor finds the EMA of the input, in this example. In the first iteration, the EMA is simply equal to the input, but in further iterations it will be determined by the control processor. The EMA and bandwidth utilization information is shared between the logic nodes. The procedure for bandwidth calculation is completed, and in particular, the shared statistic metric (EMA) is aggregated. The quality value is then determined as is the Bandwidth allocation. Following the bandwidth allocation, the control processor may determine whether there is any extra bandwidth allotment. Further iterations are intended to continue in a similar manner.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A system for managing distributed shaping in a computer network, the system comprising at least one processor configured to execute instructions stored in a memory component wherein the instructions provide for:
   a plurality of logic nodes, each logic node comprising:
      a packet processor configured to determine metrics associated with network traffic flows in the computer network;
      a control processor configured to determine a quality value based on the determined metrics and communicate the metrics with each of the plurality of logic nodes, wherein the quality value uses an exponential moving average of an input of traffic at each logic node; and
      a shaper object configured to shape the network traffic.

2. The system of claim 1 wherein each logic node is configured to communicate with others of the plurality of logic nodes to balance traffic shaping among the logic nodes.

3. The system of claim 2 wherein the balancing of the traffic flows comprises using the quality value to determine if bandwidth allocation should be adjusted upward or downward at each logic node.

4. The system of claim 1 wherein the control processor uses a smoothing factor configured to smooth the average of the exponential moving average.

5. The system of claim 1 wherein the quality value is determined at each of the logic nodes for all of the logic nodes.

6. The system of claim 1 wherein the control processor is further configured to determine whether there is additional bandwidth to be allocated to any of the logic nodes.

7. The system of claim 1 wherein the control processor is further configured to determine a utilization percentage for each logic node.

8. The system of claim 7 wherein if the utilization percentage is over a utilization threshold at the logic node and there is bandwidth to be allocated, the logic node receives a higher bandwidth allocation.

9. A method for managing distributed shaping in a computer network, the method comprising:
   initializing each logic node of a plurality of logic nodes;
   determining metrics associated with network traffic flows in the computer network;
   determining a quality value based on the determined metrics, wherein the quality value uses an exponential moving average of an input of traffic at each logic node;
   communicating the metrics with each of the plurality of logic nodes; and
   shaping the network traffic flows based on the quality value.

10. The method of claim 9 wherein the shaping of the traffic flows comprises using the quality value to determine if bandwidth allocation should be adjusted upward or downward at each logic node.

11. The method of claim 9 wherein determining metrics comprises determining a smoothing factor to smooth the average of the exponential moving average.

12. The method of claim 9 wherein determining a quality value comprises determining a quality value for each of the logic nodes at each logic node.

13. The method of claim 9 further comprising determining whether there is additional bandwidth to be allocated to any of the logic nodes.

14. The method of claim 9 further comprising determining a utilization percentage for each logic node.

15. The method of claim 14 wherein if the utilization percentage is over a utilization threshold at the logic node and there is bandwidth to be allocated, providing a higher bandwidth allocation to the logic node.

* * * * *